US009857833B2

(12) United States Patent
Morrison et al.

(10) Patent No.: US 9,857,833 B2
(45) Date of Patent: Jan. 2, 2018

(54) INFORMATION HANDLING SYSTEM LOW PROFILE HINGE

(71) Applicant: Dell Products L.P., Round Rock, TX (US)

(72) Inventors: Jason S. Morrison, Cedar Park, TX (US); Laurent A. Regimbal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 15/059,576

(22) Filed: Mar. 3, 2016

(65) Prior Publication Data

US 2017/0255231 A1 Sep. 7, 2017

(51) Int. Cl.
*G06F 1/16* (2006.01)
(52) U.S. Cl.
CPC .......... *G06F 1/1616* (2013.01); *G06F 1/1637* (2013.01); *G06F 1/1681* (2013.01)
(58) Field of Classification Search
CPC .... G06F 1/1681; G06F 1/1618; G06F 1/1601; G06F 1/1624; G06F 1/1637; G06F 1/1616; G06F 1/1679; G06F 1/1656; G06F 1/1683; E05D 3/12; E05D 3/06; E05D 3/16; E05D 11/087; E05D 3/02; E05D 3/18; E05D 3/22; E05Y 2900/531; E05Y 2900/606; H04M 1/0214; H04M 1/0237
USPC ............ 361/679.01, 679.02, 679.09, 679.22, 361/679.27, 679.26, 679.55, 679.21; 248/917–924
See application file for complete search history.

(56) References Cited

U.S. PATENT DOCUMENTS

2016/0201367 A1* 7/2016 Kato ......................... E05D 3/12
361/679.09

* cited by examiner

*Primary Examiner* — Anthony Haughton
*Assistant Examiner* — Ingrid Wright
(74) *Attorney, Agent, or Firm* — Terrile, Cannatti, Chambers & Holland, LLP; Robert W. Holland

(57) ABSTRACT

A portable information handling system hinge rotationally couples lid and main housing portions to each other with one or more shafts that rotate relative to the housing portions and/or each other. Threads integrated along the shaft length engage off axis with a friction element that generates resistance to housing portion rotational movement. Placement of the friction element in length and/or width vectors aids reduction of the system housing height vector.

14 Claims, 5 Drawing Sheets

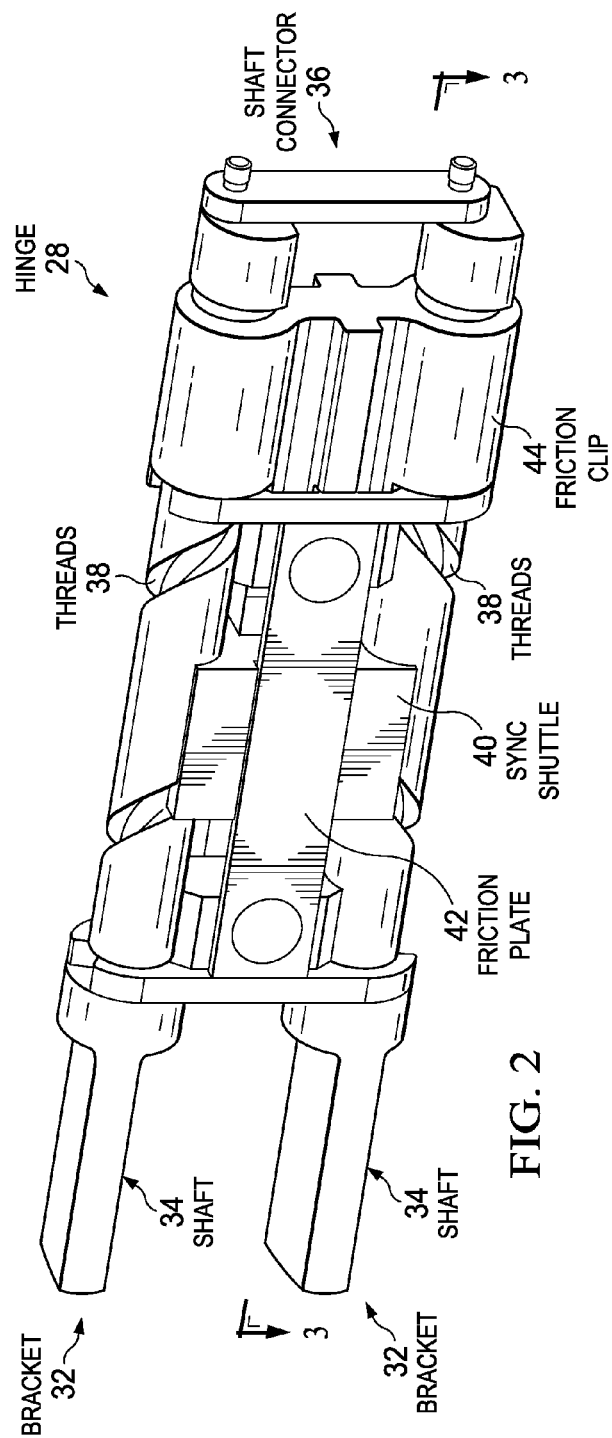
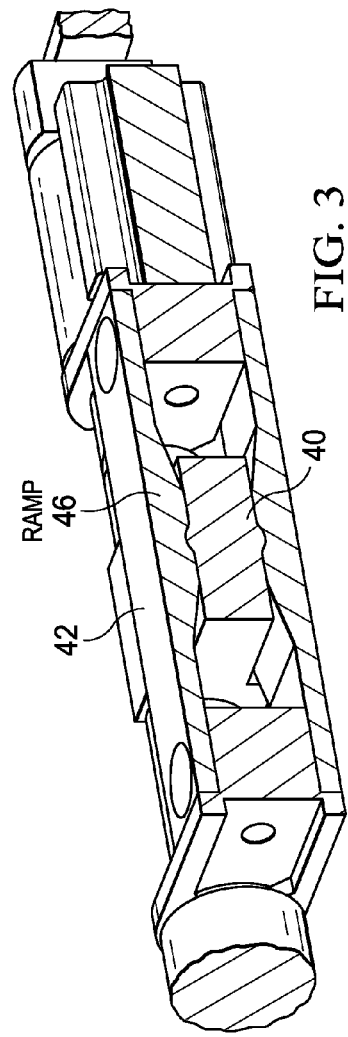
FIG. 2
FIG. 3

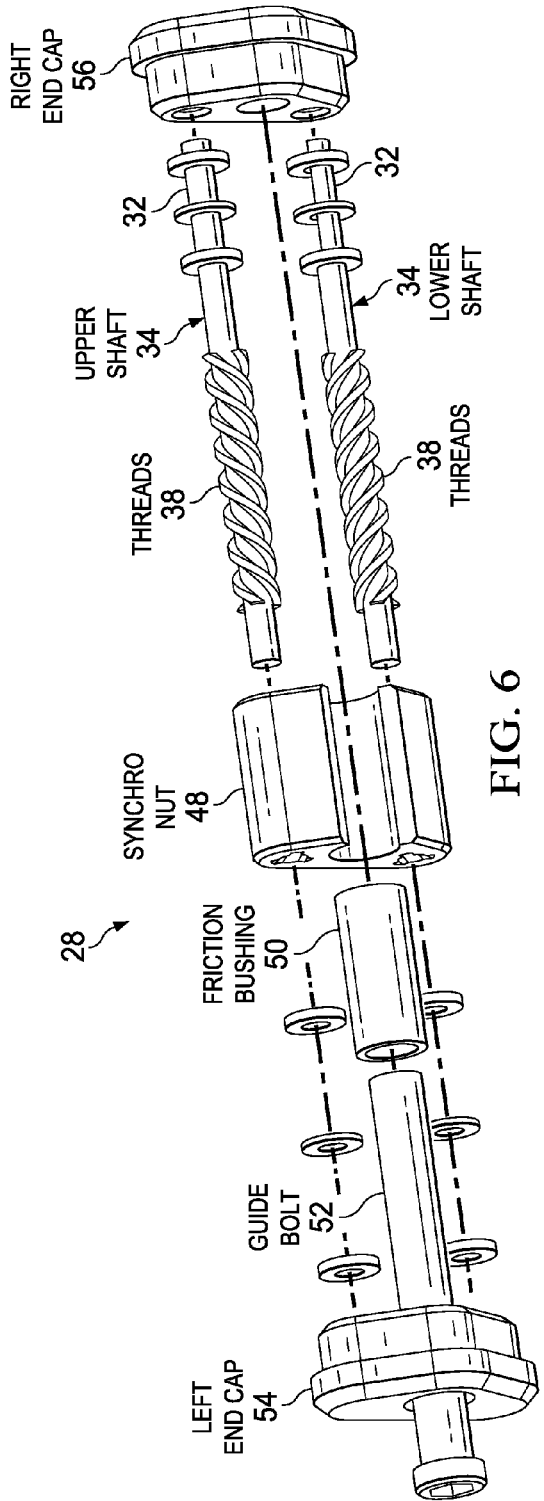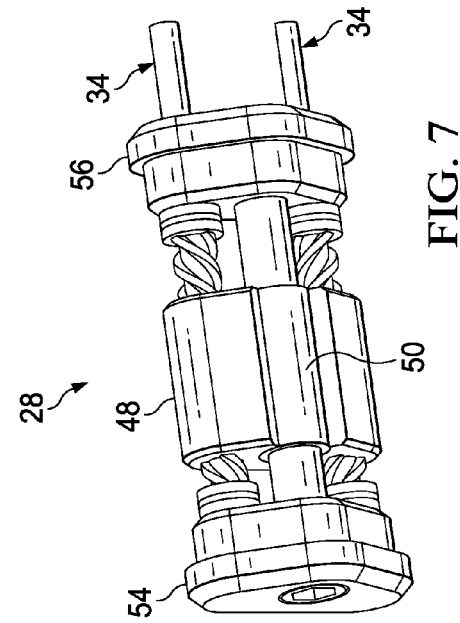

INFORMATION HANDLING SYSTEM LOW PROFILE HINGE

BACKGROUND OF THE INVENTION

Field of the Invention

The present invention relates in general to the field of information handling system portable housings, and more particularly to an information handling system low profile hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems continue to shrink in size and increase in capability. End users appreciate small portable systems that readily travel so that end users can access information on-the-go. End users tend to prefer smartphone or tablet information handling systems for accessing information that does not require extended input interactions. For example, end users access email and Internet resources through a touchscreen display that presents a keyboard to accept inputs. Touchscreen display keyboard interfaces provide a convenient input device where only minimal inputs are required, however, touchscreen display keyboard interfaces generally do not conveniently support more complex input tasks, such as word processing. Generally, end users who have to perform input intensive tasks while mobile will rely on portable information handling systems that integrate a keyboard, such as systems that have a convertible or clamshell configuration. For example, convertible and clamshell systems have a main housing portion that contains processing components and a lid housing portion that contains a display. The main and lid housing portions rotationally couple to each other with a hinge that supports the display in a viewing position relative to an integrated keyboard in an upper surface of the main portion. In convertible systems, the housing portions rotate 360 degrees relative to each other so that the display is exposed for use as a tablet.

Generally, a portable information handling system length and width is determined by the size of the display integrated in the housing. Including a keyboard in a portable information handling system tends to increase the height of the system housing compared to tablet systems that do not include a keyboard. Another factor that tends to increase the height of a clamshell or convertible system is size of the hinge that couples the housings to each other. A robust hinge design tends to include metal connecting plates and pins that have a robust enough construction to withstand repeated movements between open and closed positions. As portable housing form factors have shrunk, thin housing materials also tend to flex and unevenly distribute force at the hinges resulting in torsion that twists and warps thin metal components. In addition, hinges generally must include a friction element that holds the main and lid housing portions in position relative to each other. Typically hinges generate rotational torque by placing a friction element on the hinge shaft that restricts shaft rotation. Friction element placement and size often are a limiting factor in hinge design by adding bulky friction elements that adjust to maintain a constant force working against shaft rotation. Without a friction element to add torque to a hinge in a regular and predictable manner, end users would not be able to set up the portable information handling system to make inputs.

SUMMARY OF THE INVENTION

Therefore, a need has arisen for a system and method which provides an information handling system low profile hinge that provides predictable rotational movement and placement of housing portions relative to each other.

In accordance with the present invention, a system and method are provided which substantially reduce the disadvantages and problems associated with previous methods and systems for rotationally coupling portable information handling system housing portions to each other. Gears integrated in a hinge shaft interface with an off-axis friction element to introduce torque that resists housing portion rotation. The translation of rotational movement through shaft gears to an off axis friction element provides control of housing portion relative movement distributed in width and length elements.

More specifically, a portable information handling system has lid and main housing portions rotationally coupled to each other with a hinge assembly having one or more hinges. The hinges include at least one shaft having integrated threads that interface with an off axis friction element. The friction element generates resistance to shaft rotation to provide torque at housing portion relative rotation. In example embodiments, the shaft threads generate lateral motion of a friction element, such as a shuttle or nut coupled to the shaft that interacts with friction plate or bushing to generate torque. In another example embodiment, the shaft threads turn a gear coupled to the hinge bracket that generates torque when pressed against a friction plate. By translating shaft motion with the threads to off axis friction element motion, the friction element is displaced in the X and/or Y axes instead of the Z axis so that information handling system height is reduced.

The present invention provides a number of important technical advantages. One example of an important technical advantage is that the size of a hinge is reduced by offsetting friction elements to a linear or rotational form so that a portable information handling system housing thickness is reduced. Arranging friction elements to operate off axis allows a shifting of the frictional element size from a Z axis aligned with housing thickness to an X or Y axis aligned with housing length or width. Generally, length and width constraints are less restrictive than height constraints since portable information handling system housings are sized to integrate a display that aligns with length and width parameters. Offsetting frictional elements reduces system height while maintaining lid and main housing rotational behavior expected by an end user with adequate support provided to maintain a display at a user-desired orientation and adequate strength to withstand repeated open close cycles of rotational movement.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts an example embodiment of a hinge having a friction element that shuttles laterally along a hinge shaft;

FIG. 3 depicts a sectional upper view of the friction element engaging a friction plate ramped surface;

FIG. 6 depicts another example embodiment of a hinge having a friction element that shuttles laterally along a hinge shaft;

FIG. 7 depicts the hinge of FIG. 6 in an assembled state; and

DETAILED DESCRIPTION

Portable information handling system housing height is reduced by translating hinge shaft rotation off axis to generate torque for controlling relative position of hinge main and lid portions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
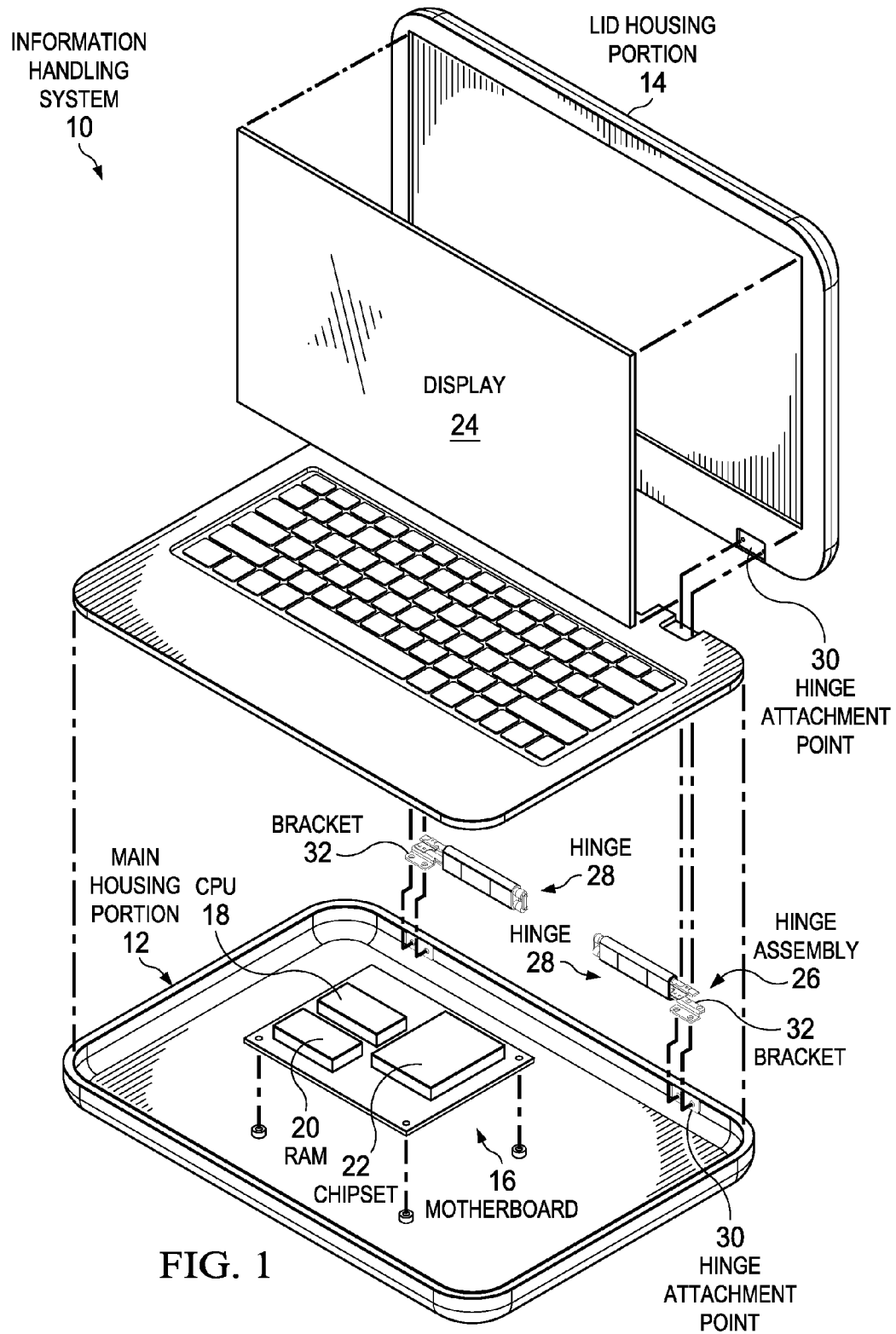
FIG. 1 depicts a blown-up view of a portable information handling system having lid and main portions rotationally coupled by a hinge assembly.

Referring now to FIG. 1, a blown-up view depicts a portable information handling system 10 having lid and main portions rotationally coupled by a hinge assembly 26. Portable information handling system 10 of the example embodiment holds processing components in a main housing portion 12 that rotationally couples to a lid housing portion 14. For example, a motherboard 16 disposed in main housing portion 12 interfaces a central processing unit (CPU) 18 that executes instructions, random access memory (RAM) 20 that stores instructions and a chipset 22 that coordinates the interaction of processing components and input/output (I/O) devices, such as by providing information in visual format for presentation at a display 24 integrated in lid housing portion 14. In alternative embodiments, lid housing portion 14 may support motherboard 16 and the processing components in a detachable tablet configuration. Hinge assembly 28 rotationally couples main housing portion 12 and lid housing portion 14 to each other to rotate between open, closed and, in some cases, convertible tablet configurations. In the example embodiment, hinge assembly 26 includes two hinges 28 that couple brackets 32 to hinge attachment points 30. In alternative embodiments, different numbers and configurations of hinges 28 may be used.

Referring now to FIG. 2, an example embodiment depicts a hinge 28 having a friction element 40 that shuttles laterally along a hinge shaft 34. Hinge 28 is a synchronous hinge having first and second parallel shafts 34 that move synchronously during rotation of lid and main housing portions coupled at brackets 32. A shaft connector 36 couples shafts 34 in a parallel relationship while a friction element 40 holds shafts 34 in parallel relationship relative to each other. Shafts 34 include threads integrated along a length of each shaft 34 and that are formed to engage with threads formed on both ends of friction element 40. As one shaft 34 turns relative to another shaft 34, motion is translation between the shafts 34 by engagement of the threads 38 and threads integrated in the ends of friction element 40.

Hinge 28 introduces resistance to rotation of shafts 34 with translation of rotational movement from shafts 34 off of the rotating axis to friction element 40. In the example embodiment of FIG. 2, friction element 40 shuttles laterally up and down the length of shafts 34 with the shuttle motion motivated by engagement of threads 38 with opposing ends of friction element 40. As friction element 40 shuttles along the length of shafts 34, a side face of friction element 40 engages a friction plate 42 to create resistance to the shuttle motion and, as a result, resistance to shaft 34 rotation. A friction clip 44 coupled at shaft connector 36 introduces a constant low level of friction by acting on the axis of rotation in a conventional manner. Friction element 40, in contrast, provides a variable level of friction based upon the interaction between friction plate 42 and friction element 40.

Referring now to FIG. 3, a sectional upper view depicts friction element 40 engaging a friction plate 42 ramped surface 46. As friction element 40 travels laterally along the length of shafts 34, ramped portions of friction plate 42 create greater amounts of friction than unramped portions. In the example embodiment, ramp 46 includes a detent formed at a central location that tends to provide increased support and less movement, such as at a normal viewing location of an end user. In various embodiments, plural different locations may be highlighted with a detent that tends to engage the shafts 34 in a fixed relative position at multiple settings.

Figure 4:
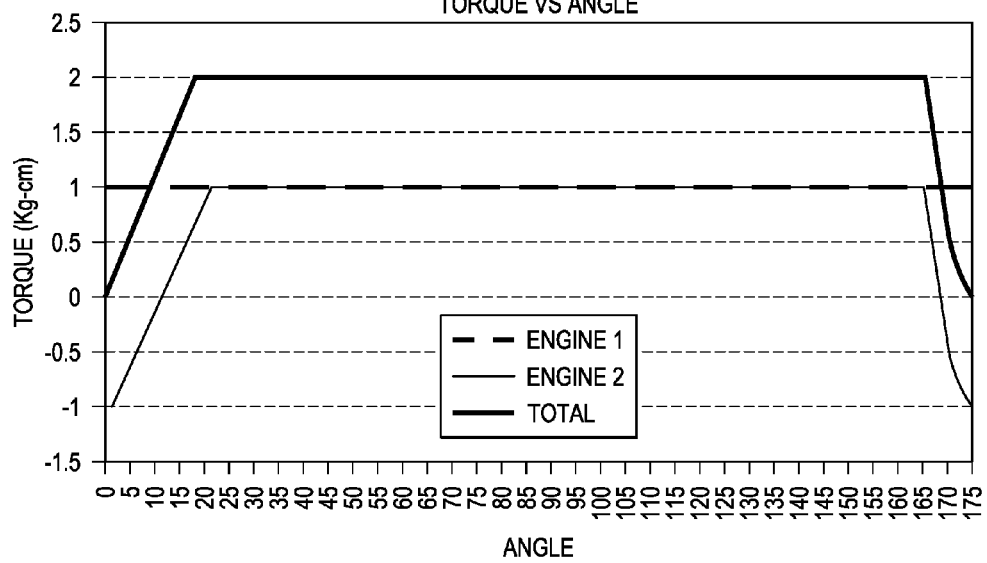
FIG. 4 depicts a graph of friction resistance torsion introduced by multiple friction elements having variable friction generation.

Referring now to FIG. 4, a graph depicts friction resistance torsion introduced by multiple friction elements having variable friction generation. In the example embodiment, conventional friction clip 44 introduces a constant but relatively low level of resistance to movement, such as is too week to hold the lid portion up at low rotation levels, such as 20 degrees of rotation from the main housing. Friction plate 42 includes a ramped surface that has a variable torque profile with low torque at low angles of rotation and higher levels of torque at angles where a user would desire to maintain a rotational position. Detents formed in friction plate 42 helps to maintain desired positions of relative rotation by providing a higher torque for rotation in any direction from the detent.

Figure 5:
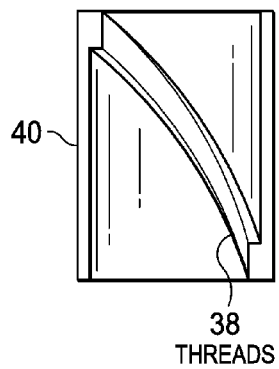
FIG. 5 depicts a top view of a friction element having threads on an end surface.

Referring now to FIG. 5, a top view depicts a friction element 40 having threads 38 on an end surface. Threads 38 of friction element 40 engage threads 38 of shafts 34 to aid synchronous motion of the parallel shafts 34. In the example embodiment, threads 38 are located on both shafts 34 and both ends of friction element 40. In alternative embodiments, threads may be included on just one end of friction element 40 while the opposing end slides over shaft 34, such as may provide a desired resistance to rotation.

Referring now to FIG. 6, another example embodiment depicts a hinge having a friction element 48 that shuttles laterally along a hinge shaft 34. In the example embodiment, shafts 34 are counter threaded to provide synchronous movement of the shafts 34 relative to each other. Friction element 48 is a nut having integrated threads to engage the threads of shaft 34. Motion of one shaft 34 relative to the other shaft 34 is translated through nut 48 so that the shafts 34 move synchronously. As shafts 34 rotate, nut 48 shuttles laterally along the length of shafts 34 to engage a friction bushing 50 with a guide bolt 52, thus generating resistance to rotation and torque for maintaining housing positions relative to each other. Guide bolt 52 is supported between end caps 54 and 56 to hold friction bushing 50 within nut 48 and to maintain substantially parallel alignment of shafts 34 to each other. Although the example embodiment depicts a relative smooth surface of friction bushing 50 and nut guide bolt 52, varying amounts of friction and detents may be added along the length of either guide bolt 52 or bushing 50 to provide a similar response to that depicted above in FIG. 4.

Referring now to FIG. 7, the hinge of FIG. 6 is depicted in an assembled state. Shafts 34 terminate in brackets 32 that couple to housing portions. As a housing portion moves, its motion translates through one shaft 34 and nut 48 to the other shaft 34. Counter threaded shafts 34 translate rotation around the shaft axis into lateral motion of nut 48 along the length of shafts 34. As nut 48 shuttles laterally along the length of shafts 34, it carries friction bushing 50 to work against guide bolt 52, thus producing torque that resists housing portion rotation. By generating friction with lateral movement as nut 48 shuttles along the length of shafts 34, the friction element is offset from the rotation movement to allow a reduced hinge height.

Figure 8:
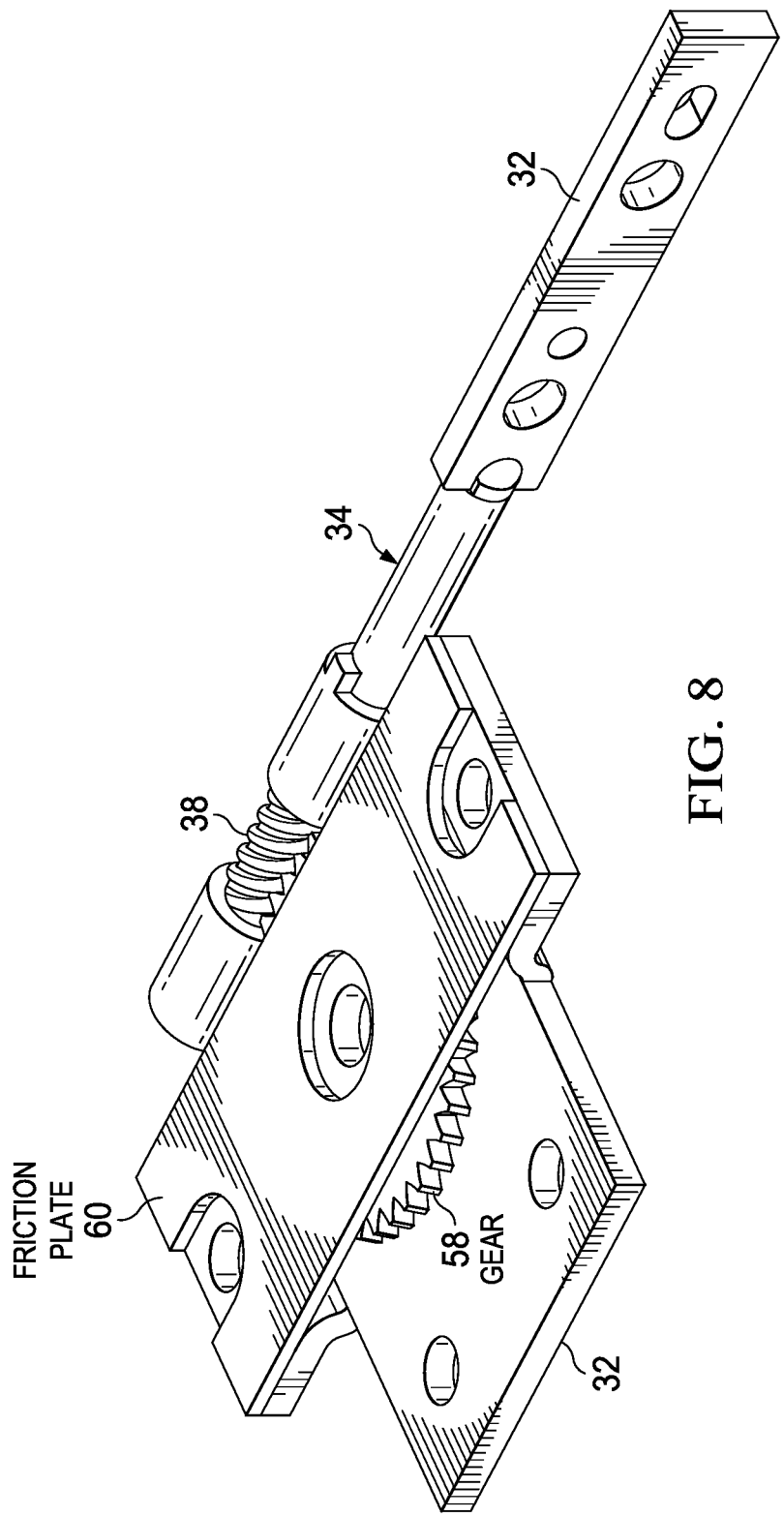
FIG. 8 depicts another example of a hinge having a friction element off axis from rotation of a hinge shaft.

FIG. 8 depicts another example of a hinge 28 having a friction element 58 off axis from rotation of a hinge shaft 34. In the example embodiment, a single shaft 34 couples to a housing portion at bracket 32 and a base bracket 32 couples to the other housing portion. Shaft 34 has threads 38 that engage an off axis gear friction element 58. As shaft 34 rotates in response to motion of a housing portion coupled to its bracket 32, the rotational movement is translated from threads 38 into rotation of gear 58 about an axis that is substantially perpendicular to the shaft 34 rotation axis. A friction plate 60 is coupled over top of the base bracket 32 so that a flat friction-generating surface contacts the upper face of gear 58 to create resistance to rotation of gear 58, and thus create torque to resist rotation of shaft 34. The amount of frictional resistance to rotation of gear 58 is set by the surface area of the friction plate 60 against gear 58 and the degree to which friction plate 60 is tightened downwards on top of gear 58. By offsetting the friction generating element from the axis of rotation of shaft 34 to the length and width dimensions of the information handling system housing, the height of the housing is effectively reduced. Further, in various embodiments, motion of the housing is regulated by altering the amount of torque generated by friction plate 60 based upon rotational position of gear 58. For example, friction plate 60 and gear 58 may have an irregular surface that increases or decreases friction based upon the rotational position of gear 58. As another example, a detent added to one or both of friction plate 60 and gear 58 may bias against rotational movement of shaft 34 in either direction, such as to aid holding a position preferred by and end user, like a preferred viewing position of a display in a lid housing portion relative to a keyboard in a main housing portion.

Although the present invention has been described in detail, it should be understood that various changes, substitutions and alterations can be made hereto without departing from the spirit and scope of the invention as defined by the appended claims.

What is claimed is:

1. A portable information handling system comprising:
   a housing having a main portion and a lid portion;
   a processor disposed in the housing and operable to execute instructions to process information;
   a memory disposed in the housing and interfaced with the processor, the memory operable to store the information;
   a display disposed in the housing and interfaced with the processor and memory, the display operable to present the information as visual images;
   a hinge coupled to the main and lid portions, the hinge coordinating rotation of the main and lid portions relative to each other at least in part with a shaft that rotates about an axis, the shaft having threads; and
   a friction element interfaced with the shaft threads, the friction element resisting hinge rotation by translating force from the shaft to a friction body that moves off-axis from the shaft rotation;
   wherein the hinge further comprises:
   a first shaft coupled to the main portion, the first shaft having threads;
   a second shaft coupled to the lid portion, the second shaft having threads; and
   the friction element disposed between the first and second shafts to engage with the first and second shaft threads, rotation of the first and second shafts driving the friction element to move laterally, the lateral movement generating resistance to shaft rotation.

2. The portable information handling system of claim 1 wherein the friction element further comprises a friction plate coupled to the hinge between the first and second shafts, the friction element engaging the friction plate as the friction element moves laterally in response to shaft rotation.

3. The portable information handling system of claim 2 wherein the friction plate has a ramped surface to vary resistance to shaft rotation based upon a lateral position of the friction element relative to the friction plate.

4. The portable information handling system of claim 1 further comprising a gear coupled to the housing and interfaced to the shaft thread, the gear turning in response to shaft rotation, the turning introducing resistance to shaft rotation.

5. The portable information handling system of claim 4 further comprising a friction plate coupled over the gear.

6. A portable information handling system comprising:
   a housing having a main portion and a lid portion;
   a processor disposed in the housing and operable to execute instructions to process information;

a memory disposed in the housing and interfaced with the processor, the memory operable to store the information;

a display disposed in the housing and interfaced with the processor and memory, the display operable to present the information as visual images;

a hinge coupled to the main and lid portions, the hinge coordinating rotation of the main and lid portions relative to each other at least in part with a shaft that rotates about an axis, the shaft having threads; and a friction element interfaced with the shaft threads, the friction element resisting hinge rotation by translating force from the shaft to a friction body that moves off-axis from the shaft rotation;

wherein the hinge further comprises:

a first shaft coupled to the main portion, the first shaft having threads;

a second shaft coupled to the lid portion, the second shaft having threads; and the friction element forming a nut having first and second threaded openings, the first threaded opening engaged with the first shaft threads and the second threaded opening engaged with the second shaft threads, rotation of the first and second shafts generating friction as the nut moves laterally along the first and second threads.

7. The portable information handling system of claim 6 further comprising a friction bushing contacting the nut and introducing resistance to lateral movement of the nut.

8. A method for rotationally coupling portable information handling system lid and main portions to each other, the method comprising:

translating relative motion of the lid and main portions to rotation of first and second shafts of a hinge coupling the lid and main portion to each other;

translating rotation of the first and second shafts from a thread integrated with the first and second shafts to a friction element interfaced with the thread, the first and second shafts translating rotation from first and second gears to move the friction element laterally along the first and second shafts;

generating resistance to the shaft rotation with the friction element by pressing the friction element against a friction plate disposed between the first and second shafts;

wherein translating relative motion of the lid and main portions further comprises:

synchronizing motion of the lid and main housing portions with first and second parallel shafts, each shaft having integrated threads; and coupling the friction element between the first and second parallel shafts to couple to the first shaft thread at one end of the friction element and to couple to the second shaft thread at an opposing end of the friction element.

9. The method of claim 8 further comprising varying the resistance by ramping the friction plate surface along a path traveled by the friction element.

10. The method of claim 8 wherein coupling the friction element further comprises inserting each shaft into a nut, the shaft threads engaging nut threads to move the nut laterally along the shafts in response to shaft rotation.

11. The method of claim 8 wherein translating rotation of the shaft further comprises turning a gear with the shaft thread, the gear integrated in a bracket that couples the hinge to one of the housing portions.

12. A portable information handling system hinge comprising:

first and second brackets configured to couple with a housing;

first and second shafts, the first shaft fixedly coupled to the first bracket, the second shaft fixedly coupled to the second bracket, the first and second shafts having threads integrated along a length; and a friction element interfaced with the threads to translate relative rotational movement of the first and second shafts into an off-axis movement that introduces resistance to rotational movement of the first and second shafts;

wherein the friction element couples to the first and second shafts and engages the threads of the first and second shafts to move along the lengths of the shafts in response to rotation of the shafts.

13. The portable information handling system hinge of claim 12 wherein the friction element comprises a shuttle element having first end with threads and an opposing second end with threads, the first end engaged with the first shaft threads, the second end engaged with the second end threads.

14. The portable information handling system hinge of claim 12 wherein the friction element comprises a nut having two threaded openings, the first shaft threads engaged in one nut threaded opening, the second shaft threads engaged in the other nut threaded opening.

* * * * *